United States Patent Office 3,527,706
Patented Sept. 8, 1970

3,527,706
METHOD OF MANUFACTURING BINDER-CONTAINING PERMANENT MAGNETS ON A FERRITE BASIS
Horst Weiland, Harksheide, and Lutz Beyer, Pinneberg, Germany, assignors, by mesne assignments, to U.S. Philips Corporation, New York, N.Y., a corporation of Delaware
Filed Aug. 21, 1967, Ser. No. 662,081
Claims priority, application Germany, Aug. 31, 1966, P 40,300
Int. Cl. B22f 3/16; H01f 1/04, 1/10
U.S. Cl. 252—62.55                3 Claims

ABSTRACT OF THE DISCLOSURE

A method of manufacturing a permanent magnet in which a ferrite having the composition corresponding to the formula $MO \cdot 6Fe_2O_3$, M being barium, strontium or lead is mixed with a low melting point binder such as lead, aluminum, lead-tin alloys, lead oxide, lead or alkali metal or alkaline earth metal salts, or lead or alkali metal containing glasses. The mixture is compacted into a body of desired shape and dimensions and heated to between 700° and 1000° C. to melt the binder which forms a rigid bond for the ferrite.

Figure 1:
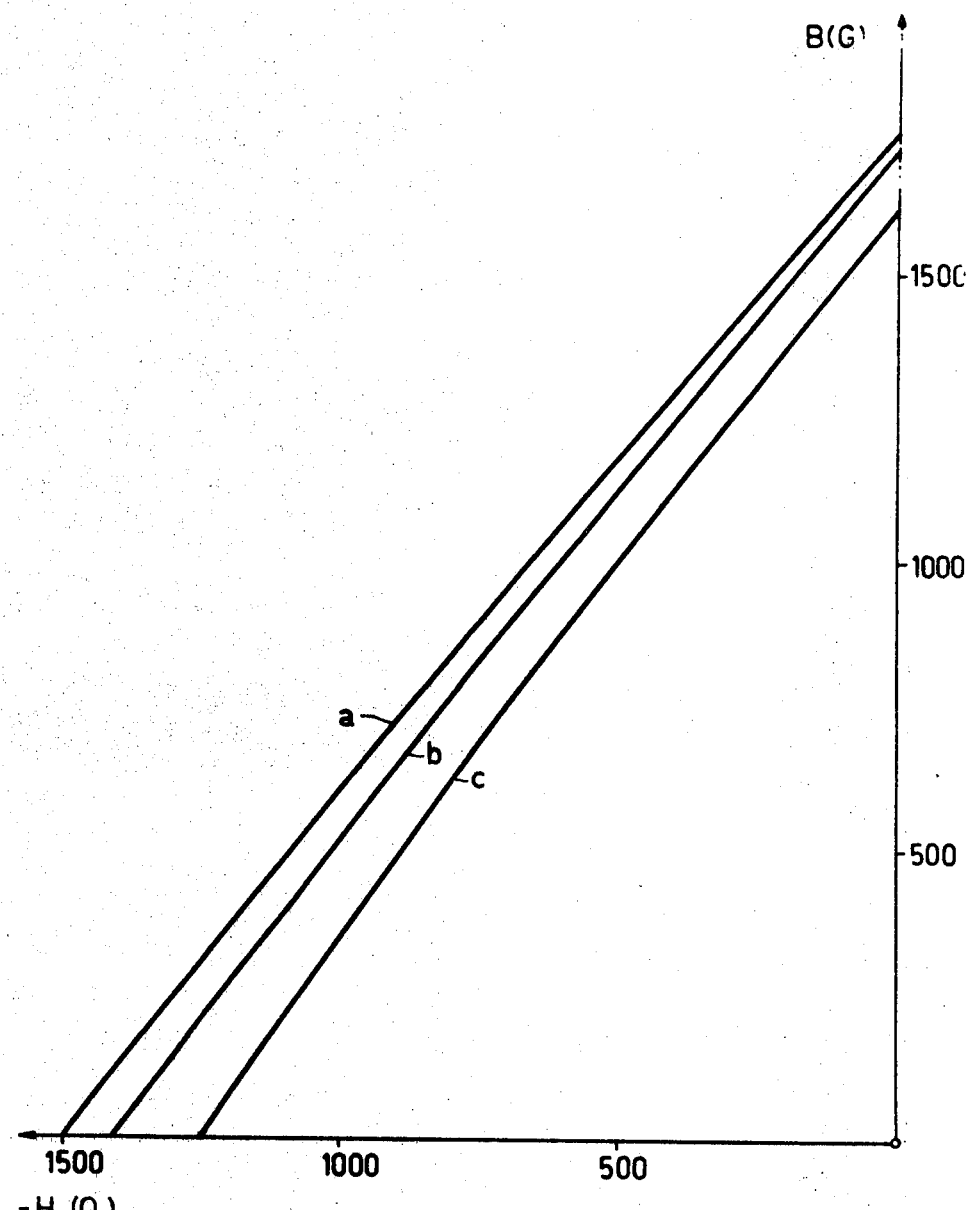

This invention relates to a method of manufacturing binder-containing permanent magnets on a ferrite basis, in which a mixture consisting of sintered ferrite powder and a binder is pressed into a moulding which is subsequently subjected to a thermal treatment.

Known permanent-magnetic ferrites consist substantially of a material corresponding to the formula $MeO \cdot 6Fe_2O_3$, in which Me is at least one of the metals barium, strontium, lead and possibly calcium. For the manufacture of these ferrites the raw materials, for example ferric oxide and barium carbonate and/or strontium carbonate and/or lead carbonate, are first mixed and sintered or calcined at temperatures between 900° C. and 1400° C., whereafter the sintered or calcined product is pulverised by grinding. The sintering process proper, that is to say the densification and consequent contraction of the ferrite material, commences at approximately 1050° C. In the manufacture of sintered magnets the resulting pulverulent ferrite is moulded into the desired shape, possibly by the influence of a constant magnetic field, substantially without the use of a binder and is subsequently sintered at temperatures between 1100° C. and 1400° C. However, a contraction between 15% and 25% then occurs so that accurate shaping without aftertreatment by polishing is impossible. In anisotropic magnetic bodies a considerable deformation also occurs during the sintering process as a result of anisotropic contraction. Thus, for example, a ring consisting of particles which have been directed diametrically must be moulded into an elliptic shape to provide a substantially circular object as the final product.

Known magnets containing a binder have, on the contrary, the advantage of a much smaller contraction and hence of a higher resitivity to deformation, although their magnetic properties are inferior to those of sintered magnets because of their lower magnetic space factor.

Binders which have been used hitherto were organic synthetic materials or rubber, which materials in the finally divided state are mixed with the ferrite powder, which has been sintered at a temperature between approximately 1200° C. and 1250° C., pressed into mouldings and then hardened or vulcanized at a temperature between approximately 150° C. and 200° C. The content of synthetic material is approximately between 5% by weight and 10% by weight, corresponding to a percentage by volume of approximately 15 to 30 for the hardened magnet. For the manufacture of anisotropic permanent magnets the mixture of ferrite powder and binder may likewise be extrusion moulded under the influence of a constant magnetic field.

The coercive field strength of permanent magnets on an oxide basis depends upon the size of the grains forming the magnet. The smaller the grain size, the higher the coercive field strength of the magnet. However, the grain size must not decrease below the size of a Weiss region, that is to say not be less than a few microns. The sintered product must therefore be pulverised to a grain size which lies within comparatively narrow limits. However, during the pulverising process, so-called "dislocations" (imperfections in the structure of the crystal lattice) arise within the ferrite particles and these in turn cause a decrease in coercive field strength. To compensate for these dislocations caused by the grinding process, it has been suggested (see the published German patent application No. 1,167,247) that the ground product, prior to the mixing with the binder, should be additionally annealed at a temperature between approximately 700° C. and 1100° C. However, during the subsequent moulding process at high pressure to obtain the moulding, dislocations are again produced in the ferrite particles and these also result in a reduced coercive strength and hence a reduced $(BH)_{max}$ value, but these dislocations cannot be neutralised by a subsequent heating to a temperature between approximately 150° C. and 200° C.

In a method of manufacturing binder-containing permanent magnets of the abovementioned kind these disadvantages are avoided by heating the binder-containing moulding to a temperature between 700° C. and 1000° C. and using as the binder a substance which forms a mechanically rigid bond with the ferrite material during this thermal treatment.

By heating the mouldings to temperatures between 700° C. and 1000° C. in conjunction with a suitable choice of the temperature-resistant binder, one surprisingly obtains the result that the dislocations which are caused when the sintered ferrite powder is ground as well as the dislocations which are caused during moulding are eliminated by a single thermal treatment, resulting in a considerable improvement in magnetic properties. This is impossible in known methods since the binders usually employed hitherto cannot sustain the abovementioned temperatures. So, in the method according to the invention, the ground ferrite need not be annealed again. In addition, the permanent magnets thus manufactured are usable even at temperatures just below the Curie-point (450° C.).

The binders preferably used may be metals and metal alloys, metal oxides, metal salts, glass and silicates the melting or softening points of which lie between 300° C. and 1,000° C. These binders form a rigid bond with the ferrite material by melting or sintering. Very satisfactory results are obtained with glasses and silicates, more particularly with lead-containing or alkaline glasses, as binder but which must preferably not contain an excess of reactive anion-producing substances, for example $B_2O_3$, which may have a disintegrating action upon the ferrite at elevated temperature.

Furthermore the following substances may be used as binders:

aluminum (melting point: 660° C.)
lead (melting point: 327° C.)
lead-tin-alloys (melting point: approx. 300° C.)
lead oxide, PbO (melting point: 884° C.)

Lead or lead oxide is chiefly used as a binder for magnets which must be rather heavy in weight, for example in view of their use as pendulum in electric clockworks.

Metal salts usable within the scope of the invention are, for example:

$PbCl_2$ (melting point: 498° C.)
$SrCl_2$ (melting point: 872° C.)
$BaCl_2$ (melting point 960° C.)
$PbF_2$ (melting point: 824° C.)
50% by weight of $Na_2CO_3$+50% by weight of $BaCO_3$ (melting point: 790° C.)
37% by weight of $K_2SO_4$+63% by weight of $SrSO_4$ (melting point: 970° C.)

that is to say more particularly salts of the metals from which the aforementioned permanent-magnetic ferrites are derived.

Within the scope of the invention, very good magnetic properties may further be realised if the binder consists, at least in part, of metal oxides from which a permanent-magnetic ferrite of the formula $MeO \cdot 6Fe_2O_3$, in which Me is at least one of the metals barium, strontium or lead, can be formed and which, when sintered, can form a rigid mechanical bond with the sintered ferrite powder. To this end the ferrite powder is admixed with a mixture of the said metal oxide components the composition of which corresponds to the above-mentioned formula. During the thermal treatment at a temperature between 700° C. and 1000° C. the said components are converted almost completely into the magnetic phase while the freshly formed ferrite is at the same time baked to the ferrite powder already present, resulting in a rigid mechanical bond. The freshly-formed magnetic phase acts not only as a binder for the ferrite powder already sintered, but also adds to an increase in the magnetic space factor and hence to an improvement in the magnetic properties, more particularly in the remanence, of the magnet. If the magnet thus obtained would have insufficient mechanical rigidity a small amount of glass as a complementary binder may still be added to the moulding mass.

The binder used may also be a material which forms a rigid mechanical bond with the ferrite material already at a temperature below 700° C. and which retains its mechanical rigidity to at least just above 700° C. Such a material is, for example, water glass of the formula $$Na_2O \cdot (3-4)SiO_2$$

which, when dissolved in water, is fluid at room temperature but which, when heated, coagulates more and more while splitting off the bonded water. The water glass may alternatively be used in the pulverulent state. In addition to water glass, certain novel synthetic materials having a mechanical resistivity to temperatures above 700° C. can be used as binders.

The content of binder in magnets manufactured in accordance with the invention is preferably between approximately 1% by volume and 17% by volume. For a binder consisting of a glass having a density of 2.4 g./ccm., this corresponds to a content up to approximately 10% by weight and for a binder consisting of lead having a density of 11.4, this corresponds to a content between approximately 3% by weight and 35% by weight. The binder content for glass preferably lies between 3% by weight and 10% by weight.

The percentages by volume may be converted into percentages by weight and vice versa in a simple manner with the aid of the following formula:

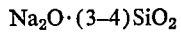

wherein:

$V_B$=the content of binder in percent by volume
$b$=the content of binder in percent by weight
$d_m$=the density of the magnet
$d_B$=the density of the binder A thermal treatment below 700° C. causes only a slight improvement in magnetic properties. Upon heating to temperatures higher than 1000° C. the contraction becomes the same as in the manufacture of sintered magnets so that the method is then no longer interesting. By way of example, reference is made to the Table I following hereinafter, which shows the magnetic values and the diametric contraction, as a function of the temperature of heating, of an anisotropic moulding having an initial density of 3.5 gms./ccm. which was manufactured, in accordance with the invention, from a moulding mass having a composition of:

94.8% by weight of ferrite powder ($BaO \cdot 6Fe_2O_3$)
2.6% by weight of a mixture consisting of 74.2% by weight of $Fe_2O_3$, 25.2% by weight of PbO and 0.6% by weight of $SiO_2$ and 2.6% by weight of glass powder having a composition of 81.1% by weight of PbO, 1.7% by weight of ZnO, 13.6% by weight of $B_2O_3$, 2.9% by weight of $SiO_2$ and 0.7% by weight of impurities.

TABLE I

| | Br (gauss) | $_BH_C$ (oersted) | $_IH_C$ (oersted) | $(BH)_{max}$ (gauss oersted) | Diametric contraction (percent) |
|---|---|---|---|---|---|
| Without temperature treatment | 2,000 | 1,360 | 1,649 | 0.82.10⁶ | 0 |

| Temperature of treatment | Duration of treatment | | | | | |
|---|---|---|---|---|---|---|
| 750 | 30 | 2,240 | 1,930 | 2,660 | 1.16.10⁶ | 0.44 |
| 800 | 30 | 2,330 | 1,970 | 2,789 | 1.25.10⁶ | 1.0 |
| 850 | 30 | 2,410 | 2,050 | 3,080 | 1.33.10⁶ | 2.16 |
| 900 | 30 | 2,540 | 2,210 | 3,400 | 1.49.10⁶ | 3.42 |
| 950 | 30 | 2,620 | 2,350 | 3,600 | 1.58.10⁶ | 5.05 |
| 1,000 | 30 | 2,790 | 2,500 | 3,620 | 1.78.10⁶ | 7.06 |
| 900 | 60 | 2,670 | 2,400 | 3,600 | 1.67.10⁶ | 4.61 |

It appears therefrom that the magnetic values may be improved considerably by the thermal treatment of the mouldings at temperatures between 700° C. and 1000° C. Nevertheless the contraction, in contrast to that which occurs in the manufacture of sintered magnets, remains so small that reworking is not necessary.

It should be noted that from British patent specification No. 883,047 and from the published German patent application No. 1,176,544 it is already known in the manufacture of sintered magnets from metal oxides to add from 0.1 to 2.4% by weight of $SiO_2$ or pulverulent glass to either the initial mixture or the prebaked material, the $SiO_2$ or the pulverulent glass serving as a modifying or sintering agent and hence delaying the crystal growth. The $SiO_2$ additions do not then act as a binder. During sintering a considerable contraction then occurs.

From the published German patent application No. 1,068,610 a method is also known for the manufacture of permanent magnets on an oxide basis, in which the reaction between the oxidic components takes place in the presence of between 5% by weight and 25% by weight of a liquid phase of PbO with $SiO_2$ and/or $B_2O_3$. Consequently the magnetic space factor would be increased. In this case also the additions do not serve as a binder since, as before, considerable contraction occurs during sintering.

In another known method (see the published German patent application No. 1,064,867) for the manufacture of strongly insulating, vitreous, soft-magnetic and hard-magnetic bodies having a glass content of at least 40% by weight ($SiO_2$ content greater than 25% by weight) the glass together with ferrite-forming metal oxides is melted at high temperatures. However, the grain size of the ferrite particles being formed cannot then be regulated so that the magnetic values thus obtainable are unsatisfactory. Furthermore, the glass content is so high that the resulting final products have only very weak magnetic properties, for example a permeability lower than 3. If the content of the ferrite-forming metal oxides were increased, then still higher melting temperatures would be necessary with again, the occurrence of considerable contraction.

Soft magnetic bodies having a low coefficient of expansion and magnetic values which are highly independent of temperature, which bodies consist of an eucryptite-containing phase and a ferrite phase, are known from the published German patent application No. 1,130,349. The glass content of the said bodies is higher than 65% by weight. They can be manufactured by melting the glass component and the ferrite powder at the same time at a temperature above 1397° C., followed by devitrification at a temperature between 1000° C. and 1200° C. However, permanent-magnetic ferrites already melt at a temperature of approximately 1400° C. Consequently, after cooling, comparatively large grains of greatly differing diameters result, giving rise again to poor magnetic values. Furthermore, considerable contraction occurs.

The U.S. patent specification No. 2,968,622 describes a method of manufacturing glass fibres containing magnetoplumbite-like ferrite particles. The wires are drawn from a melt consisting of glass and ferrite material. The molten ferrite material does not, however, crystallise in the fineness necessary for good magnetic properties.

The invention will now be described in detail with reference to several examples.

A mass consisting of 81.5% by weight of $Fe_2O_3$ and 18.5% by weight of $BaCO_3$ is mixed with a little water for approximately 10 minutes. This mixture is moulded to form briquets which are sintered in an oxidising atmosphere at a temperature of 1200° C. for 1 hour. After cooling, the briquets are broken to small pieces which are pulverised in a ball-mill within a period from 1 to 1.5 hours to form a powder consisting for 70% to 80% of particles smaller than $32\mu$.

MANUFACTURE OF ISOTROPIC MAGNETS 100 parts by weight of the ferrite powder obtained in the manner just described are homogenously mixed with 5 parts by weight of a glass powder and 1 part by weight of polyglycol (having an average molecular weight of approximately 20,000) as a lubricant and 5 parts by weight of water, said mixture being worked up into grains having a maximum dimension up to approximately 1.2 mms. The glass powder consists of 81.1% by weight fo PbO, 1.7% by weight of ZnO, 13.6% by weight of $B_2O_3$, 2.9% by weight of $SiO_2$ and 0.7% by weight of impurities and consists for almost 99% of grains having a largest size smaller than $20\mu$. This glass has a softening point of approximately 400° C. and a melting point of approximately 700° C. The granulate is moulded up to a density of approximately 3.9 g./ccm. at a pressure of approximately 4 tons/$cm.^2$. The resulting moulding is heated to a temperature of 950° C. at a rate of approximately 20° C./min., maintained at this temperature for 30 minutes, subsequently cooled and then magnetised. The linear contraction of the resulting magnet is approximately 1.5%. The percentage by weight of the binder (density 5.78 g./ccm.) is 4.76 and the density of the resulting magnet is 3.95 g./ccm. From this results a binder content of 3.25% by volume.

In Table II and FIG. 1 the magnetic values and the demagnetisation curve of this magnet $a$ are compared with corresponding values and curves of known permanent magnets containing a binder of synthetic material. The magnet $c$ is manufactured from a ferrite powder similar to that from which the magnet $a$ was manufactured and contains 5 parts by weigh of epoxy-resin powder as a binder which was hardened at a temperature of 190° C. In the manufacture of the magnet $b$, which was otherwise manufactured in a similar manner as the magnet $c$, the ferrite powder after grinding was annealed at 950° C. for approximately 1 hour.

TABLE II

|  | Magnet $a$ | Magnet $b$ | Magnet $c$ |
|---|---|---|---|
| Br (gauss) | 1,750 | 1,739 | 1,630 |
| $_BH_C$ (oersted) | 1,500 | 1,410 | 1,260 |
| $_IH_C$ (oersted) | 3,600 | 2,900 | 2,489 |
| $(BH)_{max}$ (gauss. oersted) | $0.68 \times 10^6$ | $0.68 \times 10^6$ | $0.57 \times 10^6$ |

It may be seen therefrom that the magnet $a$ manufactured in accordance with the invention has even better magnetic values than the known magnet $b$ (with annealed ferrite powder) containing a binder of synthetic material.

Similarly as for the magnet $\alpha$, magnets were manufactured using 5 parts by weight of the following binders, all in the pulverulent state:

Magnet $d$ _____ Al
Magnet $e$ _____ PbO
Magnet $f$ _____ $SrCl_2 \cdot 6H_2O$

The moulding pressure was 4 tons/$cm.^2$, the moulding density was between approximately 3.5 and 3.9 g./ccm. During the thermal treatment of the moulded products at a temperature of 920° C. the contraction was not greater than 2.4%.

The magnetic values of the permanent magnets thus manufactured are specified in Table III.

TABLE III

|  | Magnet $d$ | Magnet $e$ | Magnet $f$ |
|---|---|---|---|
| Binder | Al | PbO | SrCl |
| Density of the binder (g./ccm.) | 2.7 | 9.3 | 1.96 |
| Percentage by volume of the binder | 6.16 | 1.09 | 9.37 |
| Density of the magnet (g./ccm.) | 3.5 | 4.06 | 3.86 |
| Br (gauss) | 1,500 | 1,700 | 1,680 |
| $_BH_C$ (oersted) | 1,280 | 1,450 | 1,420 |
| $_IH_C$ (oersted) | 2,950 | 3,400 | 3,150 |
| $(BH)_{max}$. (gauss. oersted) | $0.50 \times 10^6$ | $0.50 \times 10^6$ | $0.60 \times 10^6$ |

Relative to the known magnets $b$ and $c$ containing a binder of synthetic material, the magnets $d$, $e$ and $f$ have especially higher $_IH_C$ values. This value is very important for uses of the magnets where they are exposed to the action of strong demagnetising fields, for example in electric motors. The higher the $_IH_C$ value, the more difficult it is to demagnetize the magnet.

MANUFACTURE OF ANISTROPIC MAGNETS

Start is also made from the sintered ferrite powder previously described but which is subsequently ground in a ball-mill, with water as a grinding liquid, for 6 to 10 hours to obtain a grain size of approximately $1/\mu$. The dried ferrite powder does not contain particles larger than $10/\mu$.

100 parts by weight of this ferrite powder are homogenously mixed wtih 5 parts by weight of the aforementioned glass powder (having a composition of 81.1% by weight of PbO, 1.7% by weight of ZnO, 13.6% by weight of $B_2O_3$, 2.9% by weight of $SiO_2$ and 0.7% by weight of impurities) having a grain size substantially smaller than $20\mu$ and 1 part by weight of polyglycol (having a mean molecular weight of approximately 20,000) as a lubricant. This mixture of powders is compressed in a mould, under the influence of a constant magnetic field in the direction of moulding, at a pressure of 5 tons/$cm.^2$ up to a density of approximately 3.8 g./ccm. The moulding is subsequently heated to a temperature of 950° C. at a rate of approximately 20° C./min., cooled and then magnetised. The percentage by weight of the binder is 4.76 and the density of the resulting magnet is 3.82 g./ccm. From this results a binder content of 3.15% by volume.

Figure 2:
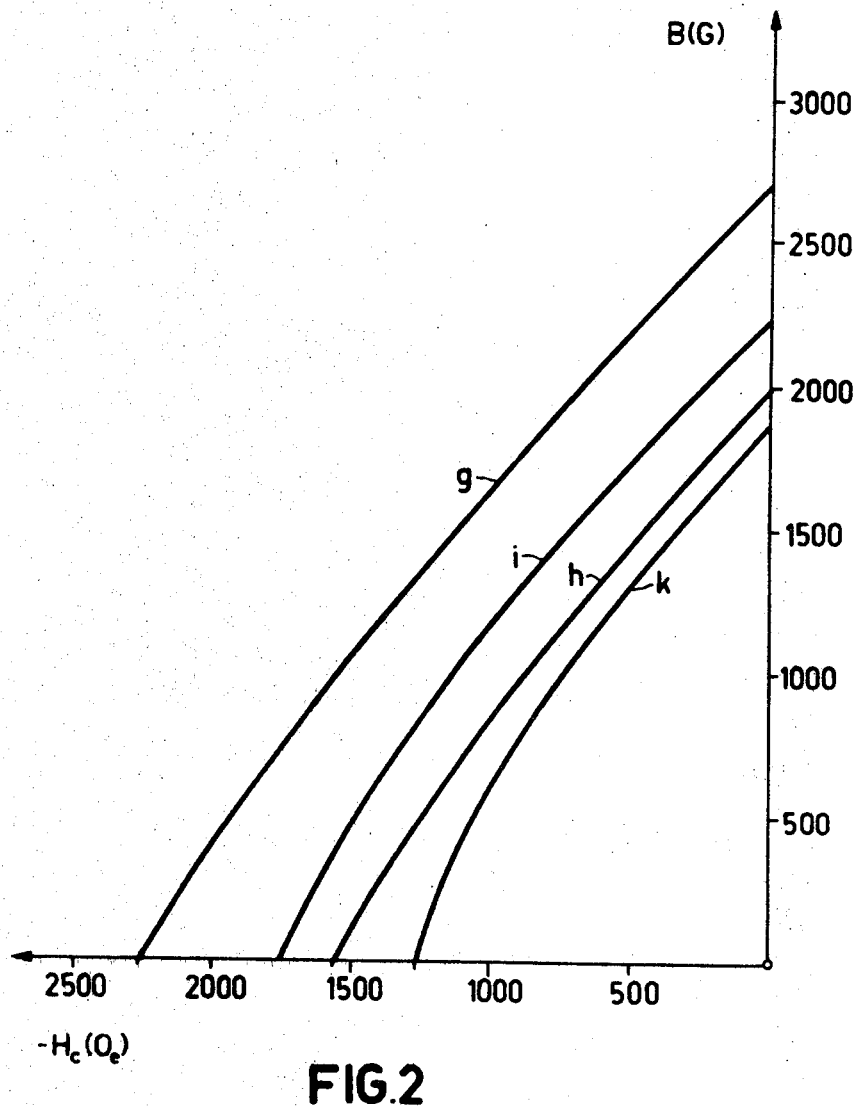

In Table IV and FIG. 2 the magnetic values and the demagnetisation curve of this anisotropic magnet $g$ are compared with the corresponding values and curves of known anisotropic magnets containing a binder of synthetic material. The last-mentioned magnets, which serve as reference material, were manufactured from a mixture, consisting of 100 parts by weight of a similar ferrite powder to that which served in the manufacture of the magnet $g$, and 5 parts by weight of synthetic material. The mixture was granulated and then moulded cold at a pressure of 5 tons./cm.$^2$ under the action of a magnetic field. The moulding was hardened by maintaining it at a temperature of 190° C. for 2 hours.

The ordinary fine-granular ferrite powder was used in the manufacture of the magnet $k$ containing a binder of synthetic material, whereas this ferrite powder was subsequently annealed at 950° C. for 1 hour in the manufacture of the magnets $h$ and $i$. The binder for the magnet $h$ was a liquid duroplast thermohardenable resin, and that for the magnets $i$ and $k$ was dry epoxy-resin powder.

TABLE IV

| | Magnet $g$ | Magnet $h$ | Magnet $i$ | Magnet $k$ |
|---|---|---|---|---|
| density of the magnet (g./ccm.) | 3.82 | 3.50 | 3.39 | 3.50 |
| percentage by volume of the binder | 3.12 | 16.7 | 16.1 | 16.7 |
| Br (gauss) | 2,730 | 2,000 | 2,250 | 1,870 |
| $_BH_c$ (oersted) | 2,260 | 1,550 | 1,750 | 1,260 |
| $_IH_c$ (oersted) | 3,200 | 2,280 | 2,150 | 1,620 |
| (BH)$_{max.}$ (gauss-oersted) | $1.7 \times 10^6$ | $0.7 \times 10^6$ | $1.18 \times 10^6$ | $0.72 \times 10^6$ |

What is claimed is:

1. A method of manufacturing a permanent magnet consisting essentially of a ferrite material having a composition corresponding to the formula MO·6Fe$_2$O$_3$ in which M is a metal selected from the group consisting of barium, strontium and lead and a binder selected from the group consisting of lead, aluminum, an alloy of lead and tin, lead oxide, a lead salt, an alkali metal salt, an alkaline earth metal salt, a lead containing glass, and an alkali metal containing glass, said binder being in an amount between 1% and 17% by volume of said magnet and having a melting point or softening point between 300° C. and 1000° C. comprising the steps of forming a mixture of said ferrite material in powder form and said binder compacting said mixture into a body of given shape and dimensions, and heating said body to a temperature between 700° and 1000° C. to form a composite body in which said binder is rigidly bonded to said ferrite material.

2. A method of manufacturing a permanent magnet as defined in claim 1 wherein the binder is water glass of the formula Na$_2$O·(3–4)SiO$_2$.

3. A method of manufacturing a permanent magnet as defined in claim 1 wherein the binder is lead oxide.

References Cited

UNITED STATES PATENTS

| 3,113,927 | 12/1963 | Cochardt | 252—62.63 X |
|---|---|---|---|
| 3,371,044 | 2/1968 | Cochardt | 252—62.54 |
| 2,837,483 | 6/1958 | Hakker et al. | |

FOREIGN PATENTS

| 883,047 | 11/1961 | Great Britain. |
|---|---|---|
| 988,836 | 4/1965 | Great Britain. |

HELEN M. McCARTHY, Primary Examiner

J. COOPER, Assistant Examiner

U.S. Cl. X.R.

252—62, 63; 264—63